United States Patent
Dollar et al.

(10) Patent No.: US 6,729,814 B2
(45) Date of Patent: May 4, 2004

(54) REVERSIBLE CUTTER BIT

(75) Inventors: Tammy Elaine Dollar, West Jefferson, NC (US); Robert William Yeager, Lansing, NC (US); Robert Glenn Hall, Purlear, NC (US)

(73) Assignee: Oldham Saw Company, Inc., West Jefferson, NC (US)

( * ) Notice: Subject to any disclaimer, the term of this patent is extended or adjusted under 35 U.S.C. 154(b) by 4 days.

(21) Appl. No.: 10/055,642

(22) Filed: Jan. 22, 2002

(65) Prior Publication Data

US 2003/0072626 A1 Apr. 17, 2003

Related U.S. Application Data

(60) Provisional application No. 60/328,941, filed on Oct. 11, 2001.

(51) Int. Cl.[7] ............................................... B23B 51/02
(52) U.S. Cl. ........................ 409/234; 144/241; 408/24; 408/226; 407/30; 407/54
(58) Field of Search .............. 407/54, 31, 53, 407/55, 30; 408/1 R, 22, 24, 226, 227, 239 A; 409/234; 144/218, 221, 240, 241; 279/14; 7/158

(56) References Cited

U.S. PATENT DOCUMENTS

| | | | | |
|---|---|---|---|---|
| 336,762 A | * | 2/1886 | Smith | ............................ 82/1.5 |
| 1,070,425 A | * | 8/1913 | Darling, Jr. | .................. 408/224 |
| 2,533,179 A | * | 12/1950 | Redinger | ...................... 279/83 |
| 2,609,209 A | * | 9/1952 | Perman | ........................ 279/49 |
| 3,841,646 A | * | 10/1974 | Bennett | ........................ 279/14 |
| 3,975,031 A | * | 8/1976 | Bennett | ........................ 279/14 |
| 4,902,177 A | * | 2/1990 | Burnett | ........................ 409/234 |
| 6,241,434 B1 | * | 6/2001 | Ajimi | ........................ 408/238 |
| 6,302,408 B1 | * | 10/2001 | Zierpka | ........................ 279/75 |
| 6,511,268 B1 | * | 1/2003 | Vasudeva et al. | ........ 408/239 R |

FOREIGN PATENT DOCUMENTS

| | | | | |
|---|---|---|---|---|
| DE | 4324869 | * | 2/1994 | .................. 407/54 |
| FR | 1210500 | * | 3/1960 | .................. 407/54 |
| SU | 1147521 | * | 3/1985 | .............. 408/239 A |

\* cited by examiner

Primary Examiner—Daniel W. Howell
(74) Attorney, Agent, or Firm—Sand & Sebolt

(57) ABSTRACT

A cutter bit is provided which includes a body having a pair of free ends with a cutter bit mounted adjacent each free end. A boss extends outwardly from the center of the body such that a portion of the body and the cutter bit may be mounted in a rotary cutting tool to allow the second cutter bit to be utilized. The bit is reversible such that either cutter bit may be positioned within the chuck of a rotary cutter tool while the cutter bit mounted on the opposite side of the body is utilized. A method of mounting a cutter bit in a rotary cutter tool is also provided which includes steps of loosening the bit within the chuck of the rotating cutting tool, removing the bit from the chuck, rotating the bit end to end, replacing the end of the bit that was out of the chuck originally into the chuck, and tightening the chuck.

13 Claims, 3 Drawing Sheets

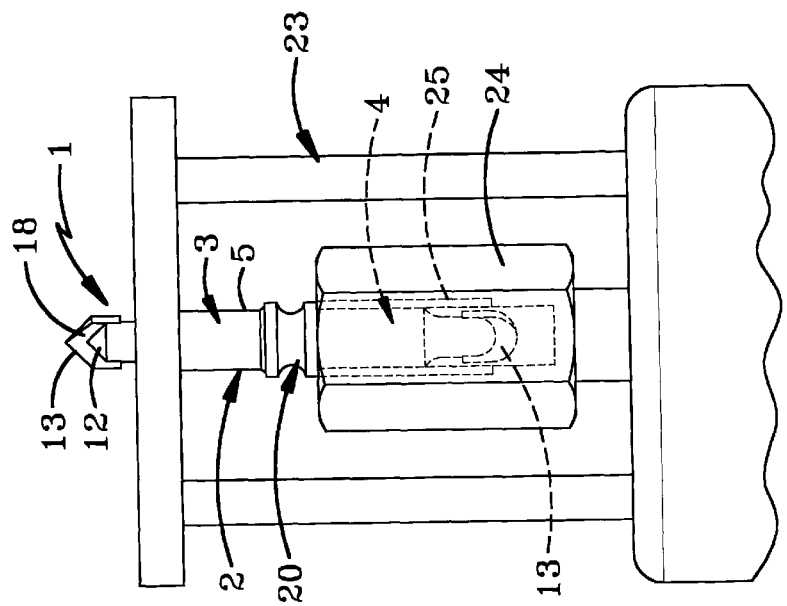
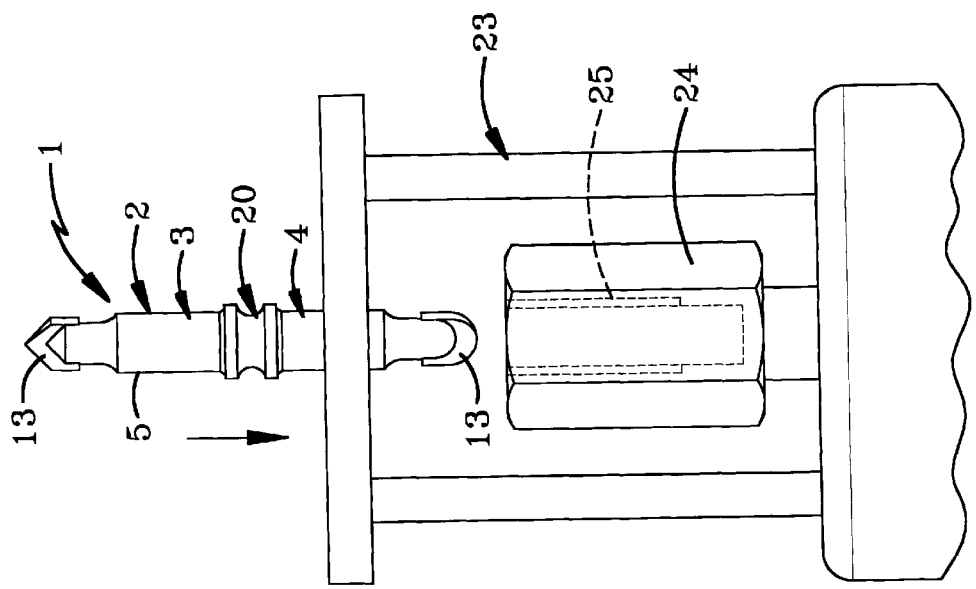

REVERSIBLE CUTTER BIT

This application claims the benefit of Provisional application No. 60/328,941 filed Oct. 11 2001.

BACKGROUND OF THE INVENTION

1. Technical Field

The invention relates to an improved cutter bit. More particularly, the invention relates to shaft mounted rotary cutter bits of the type mounted in rotary woodworking machines. Specifically, the invention relates to multi-edged rotary cutting bits having multiple profiles on a single bit.

2. Background Information

It is customary in building construction, as well as the construction of furniture and cabinetry to impart decorative profiles upon the wood. Moreover, many joints are created by imparting a variety of profiles on the wood to create stronger joints, as well as to provide increased surface areas for glue contact at the joint. Regardless of the reason for imparting a profile on the wood, the profile may be created in one of two methods. Hand planes may be utilized, which planes have a cutting knife shaped with a negative of the profile to be imparted on the wood. However, such planes are expensive, inaccurate and require significant skill to utilize. As such, many power tools have been specifically designed to impart a desired profile onto a workpiece while existing tools have been modified to allow those tools to also impart the desired profile.

While many such tools exist, routers and rotary cutters are by far the most prevalent. Rotary cutters include a motor which rotates a chuck at a predetermined or variable speed. When the rotary tool operator wishes to impart a given profile onto a workpiece, the shank of the a cutter bit having the desired profile is installed into the chuck. When the motor is activated, the cutter bit will rotate with each blade of the bit removing material from the workpiece creating the desired profile.

As woodworking becomes increasingly popular in the hobby market, and competition increases in the building trades, a significant number of cutter bits, each presenting a corresponding profile, have been developed. In some markets, the need to change bits often, or alternately, to utilized bits which have complimentary shapes, has also been developed. More particularly, router bits have been developed which include multiple profiles so that the need to change router bits is substantially reduced. These bits are often called multi-profile bits and substantially increase the usefullness of the bit, while reducing the amount of time needed to change router bits within the rotary tool.

More particularly, when a finish carpenter or trim carpenter must switch cutter bits, a significant amount of time is expended when the first bit must be removed from the rotary tool and replaced with a second bit. If the bit is to be entirely removed from the cutter, often the collet must be significantly loosened, thus increasing the amount of time necessary to exchange bits within the rotary cutter tool. Further, on a busy construction site, tools are often stored at a position far away from the area where work is actually taking place, which increases the amount of time it takes a carpenter to retrieve the required bit for use on the job site. Additionally, as multiple bits are utilized on a job site, the risk of loss of the bit is much greater, thereby increasing project costs, as the carpenter will not only have to repurchase the bit, but will loose time as a result of the lost cutter bit. For these reasons, bits with multiple profiles have fallen into favor so that a single bit may be utilized to impart multiple profiles on a common workpiece. Often times, the bit may simply be adjusted within the router, or alternatively, the base of the router may be moved relative to the bit in order to change that portion of the bit which is engaged with the workpiece, thereby changing the profile imparted on the workpiece.

The benefits of multi-profile bits as set forth above are obvious, these bits are often not appropriate to use with smaller routers known as rotary cutter tools, which have much less power to spin large multi-profile bits. The benefit of a single bit with multiple profiles cannot be understated, given the cost savings and convenience of such bits, but given that smaller rotary cutter tools have a relatively small base and are often held in one hand, the use of large bits creates a number of safely concerns, not the least of which is that a large bit and a very small tool may be difficult to control, creating an unsafe condition. It would thus be valuable to have bits having multiple profiles such as those that are used with larger commercial routers, but which solve the safety concerns associated with bits of this type.

BRIEF SUMMARY OF THE INVENTION

Objectives of the invention include providing a lightweight cutter bit.

A further objective of the invention is to provide a cutter bit wherein the bit includes multiple profiles on a single bit.

A still further objective is to provide a cutter bit having a body which may be flipped end to end with each end of the body providing alternative cutter profiles.

A still further objective is to provide such a cutter bit which is of simple construction, which achieves the stated objectives in a simple, effective and inexpensive manner, which solves problems and satisfies needs existing in the art.

These and other objectives and advantages of the invention are obtained by the improved cutter bit, the general nature of which may be stated as including a rotary cutter bit for imparting a profile to a workpiece comprising:

a body formed with an axial length and a first end and a second end, a first cutting knife mounted to the body adjacent the first end and second cutting knife mounted to the body adjacent the second end.

DESCRIPTION OF DRAWINGS

FIG. 6 is a side elevational view of a portion of a rotary cutting tool with a cutter bit of the present invention positioned above the rotary cutting tool chuck;

FIG. 7 is a side elevational view similar to FIG. 6 with the cutter bit of the present invention shown inserted into the rotary cutting tool;

BRIEF DESCRIPTION OF THE PREFERRED EMBODIMENT

Figure 1:
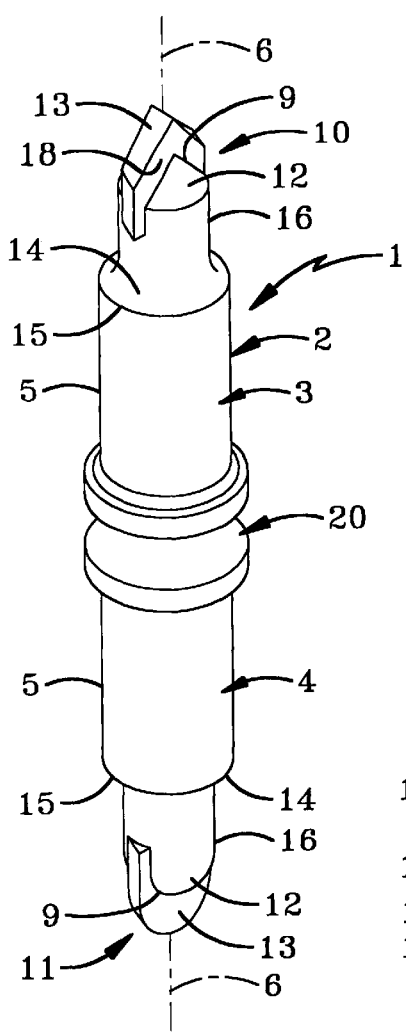
FIG. 1 is the perspective view of a router bit of the present invention.
Figure 4:
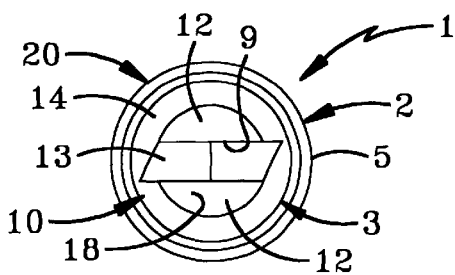
FIG. 4 is a top view of a router bit of the present invention.
Figure 5:
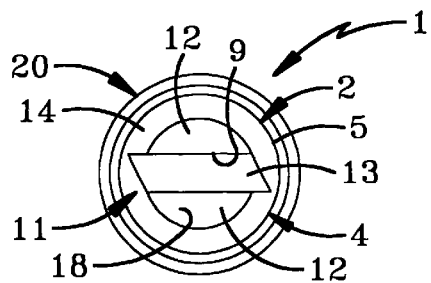
FIG. 5 is a bottom view of a router bit of the present invention.

The improved cutter bit of the present invention is indicated generally at 1, and is shown particularly in FIG. 1. Cutter bit 1 includes a body 2 having a pair of axially aligned mounting shanks 3 and 4.

Body 2 is formed with an outer surface 5 and an axis of rotation 6.

Additionally, mounting shank 3 includes cutting region 10 and mounting shank 4 includes cutting region 11. Each cutting region 10 and 11 is formed with a pair of cutter flanges 12 for retaining a cutting blade 13. Cutter flanges 12 are parallel and spaced apart and extend outwardly away from mounting shanks 3 and 4 respectively. Cutter flanges 12 define a recess 9 which is complimentarily shaped to a portion of cutter blade 13. Cutter blade 13 is then welded or otherwise attached within recess 9 and may take a variety of sizes and configurations without departing from the spirit of the present invention. A shoulder 14 extends between each mounting shank 3 and 4 and cutting regions 10 and 11 respectively. Shoulder 14 has a first diameter 15 and a second diameter 16, which is smaller than first diameter 15. Shoulder 14 is stepped down such that second diameter 16 is smaller than first diameter 15 to assure that cutting regions 10 and 11 have a smaller diameter than mounting shanks 3 and 4 respectively for purposes which will be described in more detail hereinbelow.

Figures 2, 3:
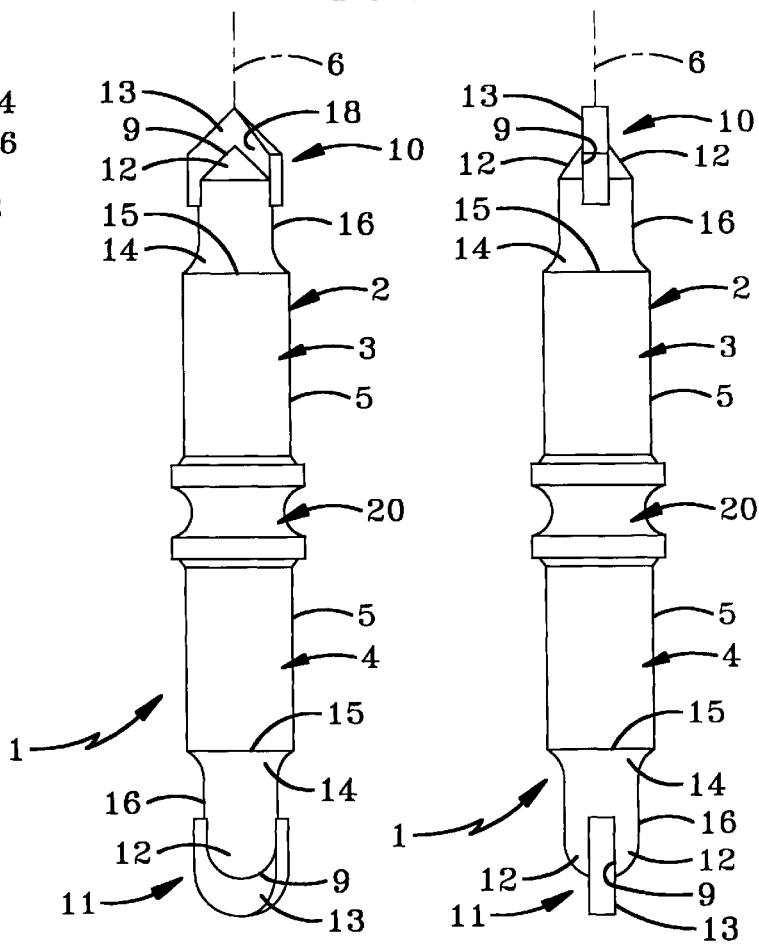
FIG. 2 is a front view of a router bit of the present invention.
FIG. 3 is a side view of a router bit of the present invention.
Figure 9:
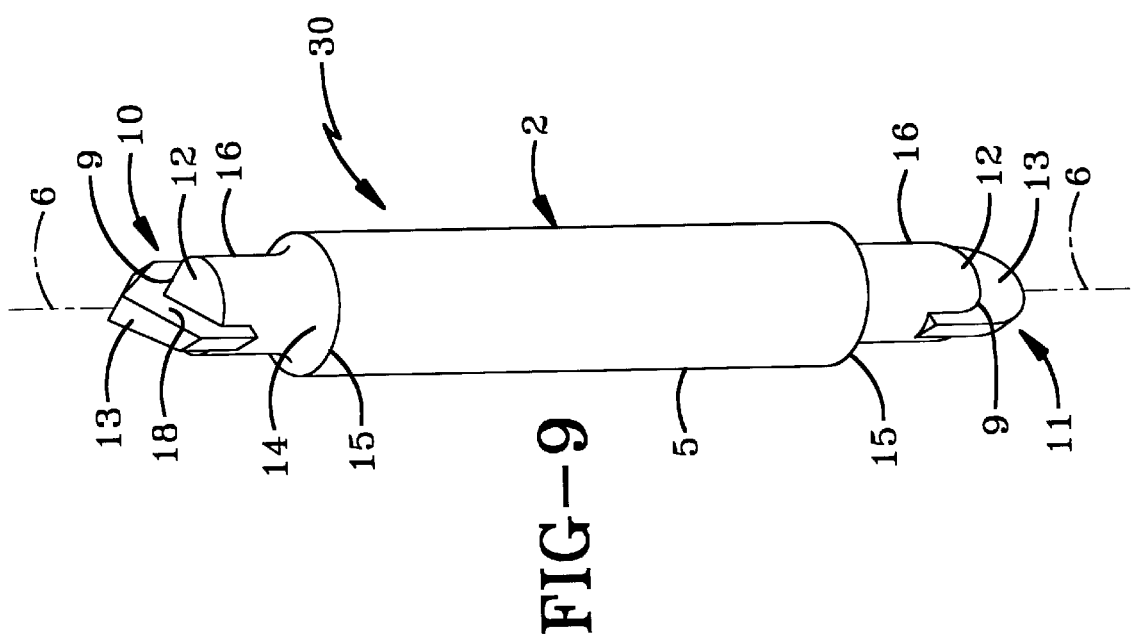
FIG. 9 is a perspective view of a second embodiment of the present invention.
Figure 8:
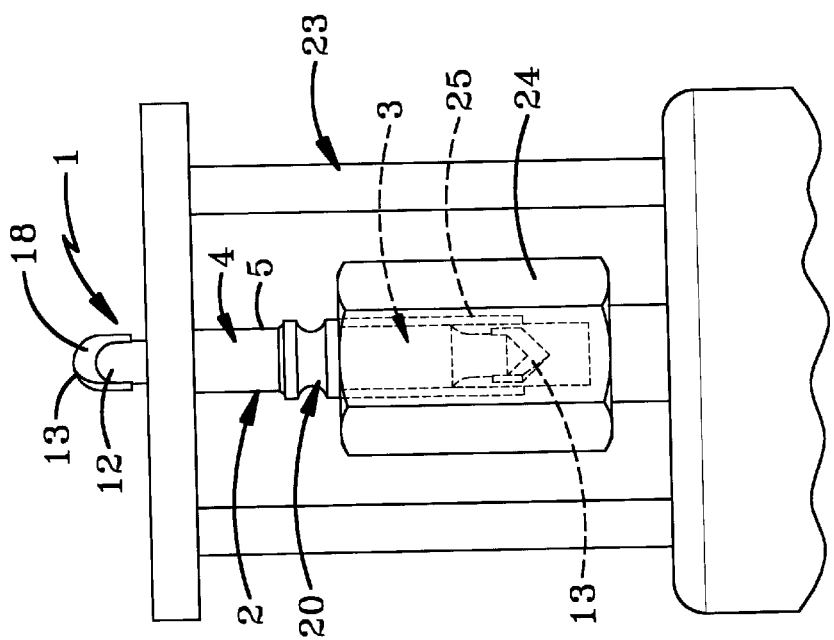
FIG. 8 is a side elevational view similar to FIG. 7 with the cutter bit of the present invention flipped end for end and inserted into the rotary cutting tool.

Referring next to FIG. 3, cutting flanges 12 and cutter blade 13 define a chip box 18, such that when cutter bit 1 is rotating, chips may move into chip box 18 and ultimately be thrown out of the cutting area to assure that cutting blades 13 continue to contact the work piece in a clean, effective manner.

Cutter bit 1 is also formed with a stop 20 or boss substantially centered between mounting shanks 3 and 4. Stop 20 extends radially outwardly from cutter bit 1, and has a diameter which is larger than the diameter of mounting shanks 3 and 4 for purposes which will be described in more detail hereinbelow.

Cutter bit 1 is generally utilized within a rotary cutter tool 23 having a chuck 24 for receiving the mounting shanks 3 and 4 of the rotary cutter bit. In one form of operation and referring to FIGS. 6 and 7, mounting shank 4 is placed within chuck 24 and is tightened by way of collet 25. When collet 25 tightens around mounting shank 4, cutter bit 1 will be positioned against movement relative to chuck 24. When rotary cutter tool 23 is turned on, chuck 24 will rotate in a range of between 6000 and 24000 rpms, such that cutter blades 13 on rotary shank 3 will contact the workpiece, removing material into chip box 18 and ultimately away from the cutting action associated with cutter bit 1. Once the operator has utilized the cutter blade 13 associated with mounting shank 3, the operator may wish to use cutter blade 13 mounted on the end of mounting shank 4. In operation, the operator would simply loosen collet 25 of chuck 24 mounted on rotary cutter tool 23, remove mounting shank 4 from chuck 24 and rotate cutter bit 1 such that mounting shank 3 is positioned back within chuck 24 of rotary cutter tool 23. Chuck 24 would then be tightened and operation of rotary cutter tool 23 would then allow use of the cutter bit mounted on mounting shank 4.

When cutter bit 1 is positioned within chuck 24 of rotary cutter tool 23, the respective shank 3 or 4 will be positioned within chuck 24 until the top of chuck 24 contacts stop or boss 20. In this manner, the operator can be assured that the cutter blade mounted on the shank housed within chuck 24 will not hit the bottom of chuck 24 and will not otherwise be harmed during operation when the opposite cutter bit is in use. Similarly, and as should be apparent from the drawings, cutting regions 10 and 11, as well as cutter blades 13, have a diameter which is smaller than the diameter of mounting shanks 3 and 4 respectively to assure that when chuck 24 is tightened around mounting shanks 3 or 4, the cutter blade 13 mounted thereon is not damaged.

In a separate embodiment of the invention, a cutter bit 30 is shown. Cutter bit 30 is similar to cutter bit 1 in every respect except that stop 20 is not provided thereon. In this manner, the operator will simply be required to be sure that when the bit is flipped, the cutter blade 13 which is not in use, and is positioned within chuck 24, is not in contact with chuck 24 so as to cause damage to either the chuck or the blade.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the scope of the invention is not limited to the exact details shown or described.

Having now described the features, discoveries and principles of the invention, the manner in which the improved cutter bit is constructed and used, the characteristics of the construction and the advantageous, new and useful results obtained; the new and useful structures, devices, elements, arrangements, parts and combinations are set forth in the appended claims.

We claim:

1. In combination, a cutter bit and a rotary cutter tool, the combination comprising:
    a motor
    a chuck rotatably mounted on the motor; the chuck defining a hole that extends through the center of the chuck, the hole having a length;
    a cutter bit having a body with a first end and a second end, the body having a first diameter and having a cross sectional configuration complimentary to the hole;
    a first cutter knife mounted on the first end of the body and a second cutter knife mounted on the second end of the body; the first and second cutter knives having a second diameter that is smaller than the first diameter of the body; and
    the first and second cutter knives being dissimilar in configuration to each other;
        wherein a portion of the body and one of the first and second cutter knives is positioned within the hole during motor operations;
        the body further having an integrally formed annular boss extending outwardly from the body at a position intermediate the first and second cutter knives and the distance from each cutter knife to the boss has a length that is less than the length of the hole in the chuck; and the boss includes a lower annular flange and an upper annular flange spaced from the lower annular flange, and a concave area extends between the upper and lower annular flanges.

2. A reversible cutter bit for use with a rotary cutter tool of the type having a chuck of a selected length, comprising:
    a body having a first end and a second end;
    a first cutter knife mounted on said first end and a second cutter knife mounted on said second end wherein the first cutter knife and second cutter knife are dissimilar in configuration to each other and in which each end of the body has at least one cutter knife flange extending away therefrom.

3. A cutter bit as defined in claim 2 in which a blade receiving recess is formed adjacent each cutter knife flange and receives the cutter blade.

4. A cutter bit as defined in claim 2 in which the body has a constant cross section.

5. A cutter bit as defined in claim 4 in which the cross section is round.

6. The cutter as defined in claim 2 in which the first cutter knife is triangular and the second cutter knife is arcuate.

7. A cutter bit as defined in claim 2 in which an annular boss extends outwardly from the body at a position intermediate the cutter knives.

8. A cutter bit as defined in claim 7 in which the boss is integrally formed with the body.

9. A cutter bit as defined in claim 8 in which the boss includes a lower annular flange and an upper annular flange spaced from the lower annular flange.

10. A cutter bit as defined in claim 9 in which the distance from each cutter bit to the boss has a length, and in which the length is adapted to be less than the chuck length.

11. A cutter bit as defined in claim 10 in which the boss is adapted to be positioned adjacent the chuck when in use.

12. A cutter bit as defined in claim 2 in which the cutter knifes knives have a first diameter and the body has a second diameter and in which the first diameter is smaller than the second diameter.

13. The combination as defined in claim 1 in which the boss is positioned adjacent the body.

* * * * *